United States Patent
Boyette

(10) Patent No.: US 9,510,579 B1
(45) Date of Patent: *Dec. 6, 2016

(54) FISHING SINKER

(71) Applicant: Ronald Boyette, Kenly, NC (US)

(72) Inventor: Ronald Boyette, Kenly, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,745

(22) Filed: Jun. 21, 2016

Related U.S. Application Data

(63) Continuation of application No. 14/267,292, filed on May 1, 2014, now Pat. No. 9,392,780.

(60) Provisional application No. 61/823,728, filed on May 15, 2013.

(51) Int. Cl.
*A01K 95/00* (2006.01)

(52) U.S. Cl.
CPC ..................... *A01K 95/00* (2013.01)

(58) Field of Classification Search
USPC .......... 43/43.12, 43.1, 42.06, 43.14
See application file for complete search history.

(56) References Cited

U.S. PATENT DOCUMENTS

| | | | | |
|---|---|---|---|---|
| 2,308,238 A | * | 1/1943 | Baker | A01K 95/00 24/908 |
| 4,138,794 A | * | 2/1979 | Chiodini | A01K 97/02 43/43.14 |
| 4,145,833 A | * | 3/1979 | Ratte | A01K 95/00 43/44.89 |
| 4,837,968 A | * | 6/1989 | Lin | A01K 95/00 43/43.12 |
| 5,054,230 A | * | 10/1991 | Woodman | A01K 97/02 43/42.06 |
| 5,375,365 A | * | 12/1994 | Bronder | A01K 95/00 43/43.12 |
| 5,444,937 A | * | 8/1995 | Borner | F16B 2/205 24/908 |
| 6,851,217 B1 | * | 2/2005 | Rayner | A01K 95/005 43/43.12 |
| 8,683,736 B1 | * | 4/2014 | Perches | A01K 91/02 43/41.2 |
| 2011/0225872 A1 | * | 9/2011 | Farley | A01K 93/00 43/44.91 |

* cited by examiner

*Primary Examiner* — Christopher P Ellis
(74) *Attorney, Agent, or Firm* — Coats & Bennett, P.L.L.C.

(57) ABSTRACT

A sinker configured to be attached to fishing line and used during fishing to position a fishing hook at or in proximity to the bottom of the body of water. The sinker may include a main body that has a folded construction. The body may include one or more sets of paired cavities. Each of the cavities align together in the folded, closed orientation to form an enclosed space to hold one or more of a fish attractor or weight. The sinker may also include additional attachments that attach to the main body and are configured to receive additional weight and/or fish attractor. The sinker may also include an anchor configured to engage with the bottom of the fishing location, and may also include a stabilizer for additional stabilization.

16 Claims, 11 Drawing Sheets

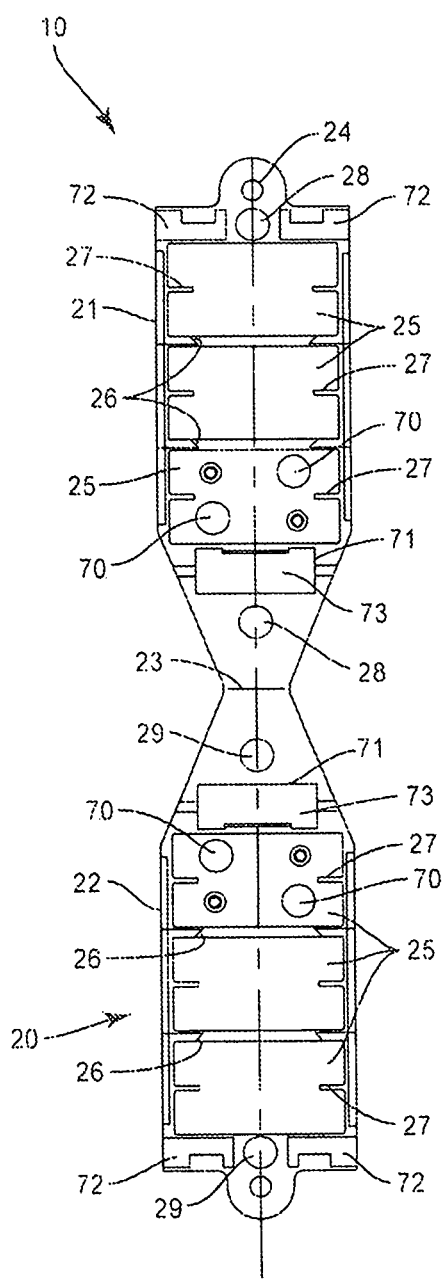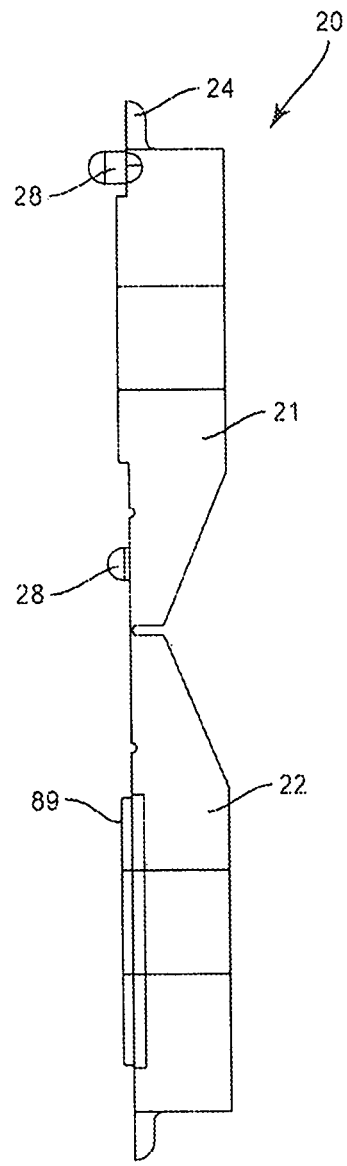
FIG. 4
FIG. 5

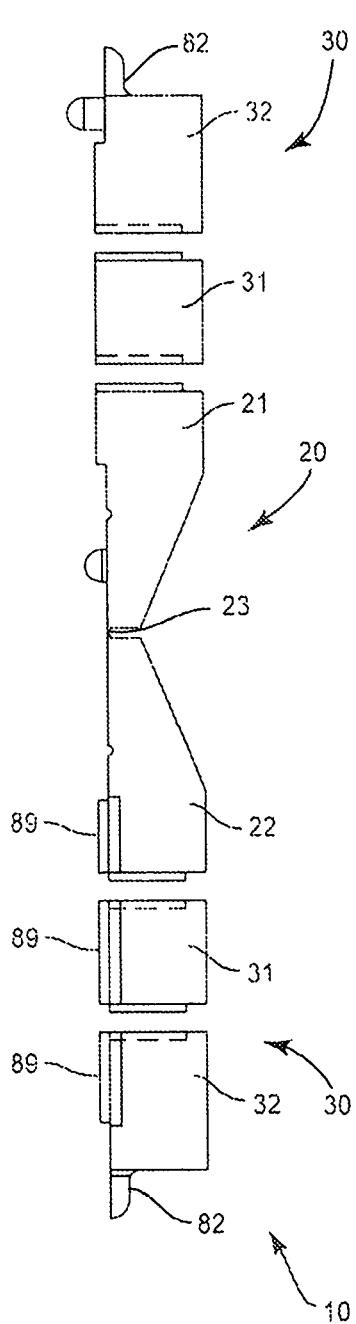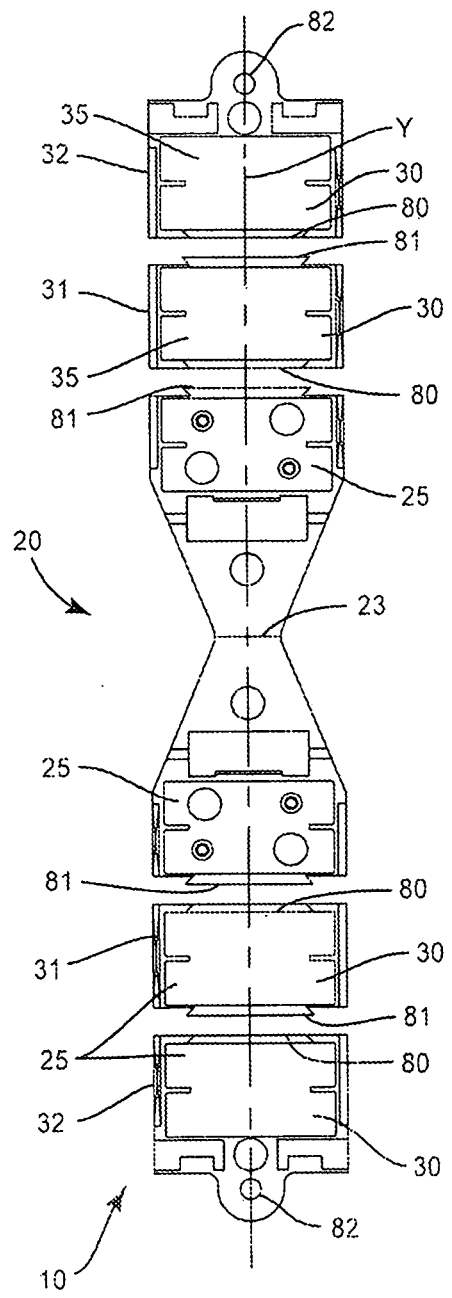
FIG. 7
FIG. 8

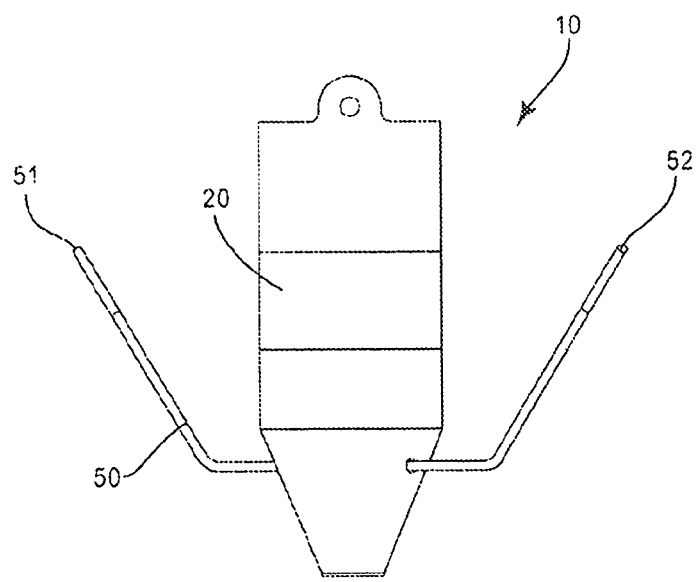
*FIG. 11*
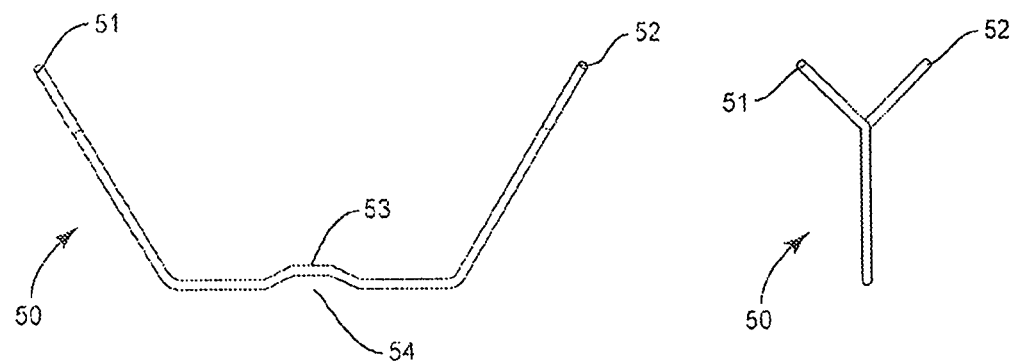
*FIG. 12*  *FIG. 13*

FISHING SINKER

CROSS-REFERENCE TO RELATED APPLICATIONS

The present application is a continuation of U.S. application Ser. No. 14/267,292 filed on May 1, 2014, which claims the benefit of U.S. Application 61/823,728 filed on May 15, 2013. These applications are hereby incorporated by reference in their entireties.

BACKGROUND

Sinkers are often used during fishing to position a fisherman's hook at or in proximity to a bottom of the body of water. The hook may be used for holding bait, or may be part of an artificial lure that has an appearance that attracts fish. The sinker is configured to be attached to the line and to remain attached when cast into the body of water by the fisherman. The weight of the sinker is adequate to maintain the hook at or in proximity to the bottom of the body of water.

Previous sinkers have provided just for the ability to weight the lure or bait. The sinker provides no other purpose, such as a means to attract a fish to the fisherman's hook.

Previous sinkers are designed to weigh a specific amount. By way of example, a sinker may weigh 0.5 ounces, 1.0 ounces, or 2.0 ounces. If the fisherman needs to add additional weight to their line, they were required to attach a separate weight to their line. This often resulted in a large number of weights that were attached along the length of the line. This made it difficult for the fisherman to accurately cast their hook into the water. The additional weight spread along the line also made it more difficult for the fisherman to feel a fish on the hook.

SUMMARY

The present application is directed to a fishing sinker configured to be attached to a fishing line. The sinker includes one or more interior spaces configured to hold a weight and/or fish attractor. The sinker is adjustable between open and closed orientations.

One embodiment is directed to a fishing sinker that includes a body with first and second sections. Each of the sections includes opposing first and second ends, one or more cavities that each includes a hollow interior space surrounded by outer walls, and an open front face. A hinge is positioned at the first ends of the first and second sections. The hinge pivotally connects the first and second sections and provides for movement of the first and second sections between open and closed orientations. The open orientation includes the front faces of the first and second sections being spaced apart. The closed orientation includes the front faces in contact and each of the one or more cavities of the first section being paired with one of the cavities on the second section. Each pair forms a single enclosed interior space.

The sinker may also include an extension that extends outward beyond the front face of the first section and a receptacle that extends into the front face of the second section with the extension being positioned in the receptacle in the closed orientation.

The first and second sections and the hinge may be a unitary one-piece construction with the hinge being thinner than the first and second sections.

The sinker may include an enclosed opening positioned at the second end of one of the first and second sections and away from the first end with the opening configured to receive fishing line.

The sinker may include a width of each of the first and second sections being smaller at the first ends than at the second ends.

The sinker may include openings in each of the first and second sections with each of the openings extending into one of the cavities.

The sinker may include an attachment configured to attach to each of the second ends of the first and second sections with the attachment including an enclosed interior cavity.

Another embodiment is directed to a fishing sinker that includes an elongated body with first and second ends spaced apart along a major axis, an intermediate hinge, a first section extending between the hinge and the first end, a second section extending between the hinge and the second end, a first cavity formed in the first section and positioned a first distance from the intermediate hinge along the major axis with the first cavity including an open face, and a second cavity formed in the second section and positioned the first distance from the intermediate hinge along the major axis with the second cavity including an open face. The first and second sections are movable about the hinge between open and closed orientations with the first and second cavities forming an enclosed space in the closed orientation.

The sinker may include a separate attachment including an enclosed interior space with the attachment configured to be removably attached to the first and second ends.

The sinker may include a first passageway formed in the first section between the first cavity and the intermediate hinge and a second passageway formed in the second section between the second cavity and the intermediate hinge with each of the first and second passageways extending through a width of the body and including open faces that align together in the closed orientation.

The sinker may include a wire anchor that includes a straight central section, a first bent arm on a first end of the central section, and a second bent arm on a second end of the central section. The central section may be positioned within the first and second passageways and first and second bent arms may be positioned on opposing sides of the body.

The sinker may include the first and second sections each with a common length measured along the major axis such that the first and second ends align in the closed orientation.

The sinker may include the body having an hourglass shape with the intermediate section being narrower than the first and second sections.

The sinker may include the body having a unitary, one-piece construction that includes the hinge, the first section, and the second section.

The sinker may include a first opening in the body that leads into the first cavity and is positioned away from the open face of the first cavity, and a second opening in the body that leads into the second cavity and is positioned away from the open face of the second cavity.

Another embodiment is directed to a method of using a fishing sinker that includes positioning a main body in an open orientation with first and second sections of the main body being spaced apart and the first and second sections being connected together along an intermediate section. The method includes inserting one of a weight and a fish attractor into an open first compartment in the first section. The method includes folding the first and second sections about the intermediate section and aligning an open second compartment in the second section with the first compartment. The method also includes contacting the first section against the second section and enclosing the one of the weight and the fish attractor within a single compartment formed by the first and second compartments.

The method may also include aligning together dividers in each of the first and second sections and forming the single compartment.

The method may also include attaching an additional compartment to each of the first and second sections of the main body with the compartment being attached away from the intermediate section.

The method may include moving the main body through water and rotating an elongated wire anchor that extends through the main body such that exposed ends of the wire anchor face away from the direction of movement.

Another embodiment is directed to a fishing sinker that includes one or more interior compartments to hold either additional weight and/or one or more fish attractors. The fishing sinker may include a main section that is movable between an open orientation to insert the weight and/or attractor, and a closed orientation to form enclosed compartments to secure the weight and/or attractors.

One embodiment is directed to a fishing sinker with a first section including a first part of compartments, a second section including a second part of compartments, and a hinge positioned between and connecting together the first and second sections. The first and second sections are movable about the hinge between an open orientation with the compartments being exposed, and a closed orientation with the portions of compartments of the first section being aligned with the portions of the compartments of the second section to form enclosed interior spaces.

In this embodiment, the first section, second section, and hinge may be constructed from a single, unitary piece.

In this embodiment, the sinker may also include a module configured to fit within one of the interior spaces.

Another embodiment is directed to a fishing sinker that includes a main section having a first section, a second section, and an intermediate hinge. The main section is movable between an open orientation with the first and second sections spaced away from each other about the hinge and a closed orientation with the first and second sections mated together to form a plurality of enclosed compartments that extend between a first end formed at the hinge and an opposing second end. The sinker also includes a first coupling member positioned at the second end. A first modular attachment with a second coupling member is configured to removably engage with the first coupling member. The first modular attachment member includes an interior compartment.

This embodiment may also include a second modular attachment configured to be removably attached to the first modular attachment. The second modular attachment includes an interior compartment.

The application also includes a method of constructing a fishing sinker. The method includes pivoting about an intermediate hinge a first section of the sinker relative to a second section of the sinker and moving the sections to an open orientation. While in the open orientation, inserting a first module into the first section and pivoting about the intermediate hinge the first section relative to the second section and moving the sections to a closed orientation with sections of the first and second sections aligning together to form compartments with the first module being positioned within one of the modules;

The method may also include securing the first and second sections in the closed orientation.

The method may include that pivoting the sections about the hinge includes folding the first and second sections about the hinge.

The method may also include attaching an attachment to an end of the sinker with the attachment including an interior space.

The method may also include inserting a second module into the interior space prior to attaching the attachment to the end of the sinker.

The various aspects of the various embodiments may be used alone or in any combination, as is desired.

BRIEF DESCRIPTION OF THE DRAWINGS

FIG. 4 is a front view of a sinker in an open orientation.
FIG. 5 is a side view of a sinker in an open orientation.
FIG. 7 is an exploded side view of a sinker.
FIG. 8 is an exploded front view of a sinker.
FIG. 11 is a side view of a sinker that includes an anchor.
FIG. 12 is a side view of an anchor.
FIG. 13 is an end view of an anchor.

DETAILED DESCRIPTION

Figure 1:
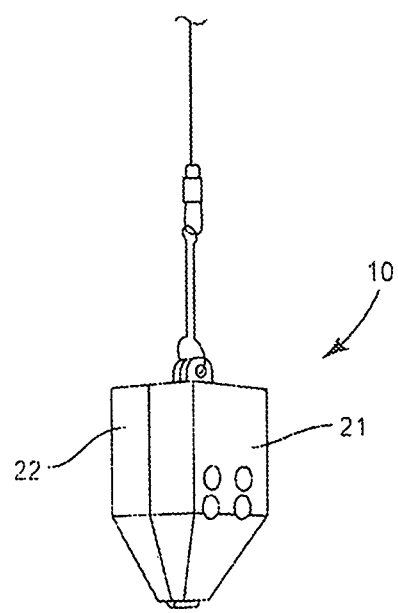
FIG. 1 is a perspective view of a sinker in a closed orientation.
Figure 2:
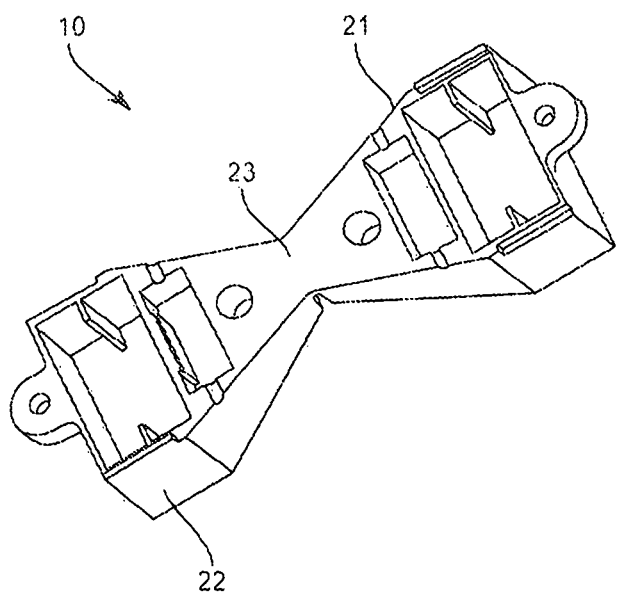
FIG. 2 is a perspective view of a sinker in an open orientation.

The present application is directed to a fishing sinker configured to be attached to a fishing line. FIG. 1 illustrates a sinker 10 in a closed orientation, and FIG. 2 illustrates a sinker in an open orientation. The sinker 10 generally includes a main body 20 that has a folded construction including a first section 21 and a second section 22 that are connected together at a hinge 23. In the open orientation, the sections 21, 22 are separated to provide access to an interior space. Weights, fish attractor, or other elements may be positioned in the interior space. In the closed orientation, the sections 21, 22 are placed together to enclose the interior space and prevent escape of the inserted materials.

Figure 3:
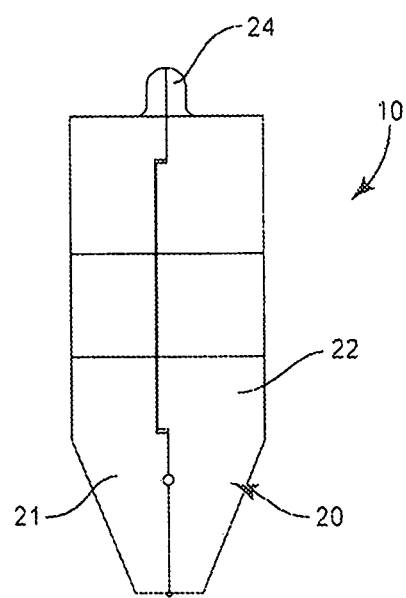
FIG. 3 is a side view of a sinker in a closed orientation.

FIG. 3 illustrates one embodiment of the sinker 10 in the closed orientation. The main body 20 includes a first section 21 and an opposing second section 22 that are connected together at a hinge 23. The sections 21, 22 have substantially the same shape and size to align and engage together in the closed orientation. In the closed orientation in one embodiment, the first ends of each section 21, 22 are aligned together, and the opposing second ends of each section 21, 22 are also aligned together. The main body 20 may also include an attachment point 24 to receive fishing line 102.

The main body 20 may include various shapes and sizes. In one embodiment as illustrated in FIG. 3, the main body 20 is substantially bullet shaped and has an enlarged portion at a first end that tapers towards the hinge 23 at a second end.

Figure 17:
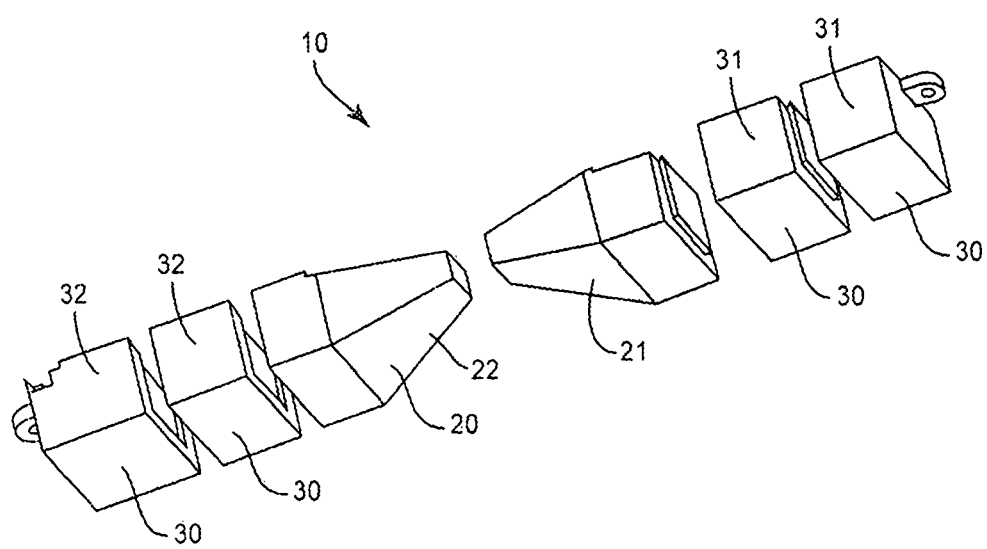
FIG. 17 is an exploded perspective view of a sinker.

FIG. 4 illustrates the main body 20 in an open orientation with the first and second sections 21, 22 pivoted apart at the hinge 23. In this embodiment, the main body 20 includes a single, unitary construction and the hinge 23 is formed by a relatively thin section that is flexible to provide movement between the open and closed orientations. The sections 21, 22 may also be connected together in other manners that provide for movement. Examples include but are not limited to rings that extend through each section 21, 22, mechanical fasteners, and plastic pins. In another embodiment, the two sections 21, 22 are separate pieces that can be separated from each other in the open orientation as illustrated in FIG. 17.

The interior of the main body 20 includes one or more compartments 25 each configured to receive a module 40. The embodiment of FIG. 4 includes a total of three compartments 25, with other embodiments featuring more or fewer compartments 25 (e.g., FIG. 1 includes a single compartment 25). Each of the compartments 25 is formed in part by the first section 21 and the second section 22. Dividers 26 may be formed by the first and second sections 21, 22 to segregate the compartments 25. The dividers 26 may extend completely across and completely separate the adjacent compartments 25, or may extend a limited distance such that an opening is formed that communicates with each of the adjacent compartments 25. The compartments 25 may further include supports 27 that extend into the compartments from the first and second sections 21, 22 to further support and position the inserted modules 40.

In the closed orientation, the front faces of the outer walls of each of the sections 21, 22 abut together to enclose the compartments 25. Further, the dividers 26 may also abut together to segregate the compartments 25. The main body 20 may be maintained in the closed orientation in a variety of different manners. In one embodiment, one of the sections 21, 22 includes one or more extensions 28 that fit with corresponding receptacles 29 in the opposing sections 21, 22. The extensions 28 and receptacles 29 provide a press fit to maintain the closed orientation. The closed orientation may also be maintained by inserting and tying the fishing line 102 through the attachment point 24 formed in the first and second sections 21, 22. Another manner may include one or more mechanical fasteners that extend between and engage each of the sections 21, 22.

One or both of the sections 21, 22 may include one or more openings 70 that extend into the compartments 25. The openings 70 provide for water to enter into the compartments 25 when the sinker 10 is placed into the water 100. The openings 70 may also provide for fish attractor scent to emanate from the compartment 25 and into the surrounding water to attract fish. The size and placement of the openings 70 may vary. Preferably, openings 70 are formed on two or more sides of the compartments 25. This provides for the scent to exit the compartment 25 in the event that one side is placed against the bottom 101 of the lake, ocean, stream, etc. and substantially blocks a portion of the openings 70.

The main body 20 may also include a receptacle 71 formed by the first and second sections 21, 22 to receive the anchor 50. FIG. 4 includes the receptacle 71 having an enlarged central section 73 and smaller outlets that extend in opposing directions. The receptacle 71 may be formed in various positions along the main body 20, but is preferably positioned in proximity to the hinge 23 and away from the fishing line attachment 24. In one embodiment as illustrated in FIG. 4, the receptacle 71 is positioned towards the first ends of the sections 21, 22.

The main body 20 may also include a second set of receptacles 72 to receive stabilizers 60 as will be explained below. The receptacles 72 include at least one exterior opening to receive an arm of the stabilizer 60. In one embodiment as illustrated in FIG. 4, the main body 20 includes two receptacles 72 that include exterior openings on opposing sides. The receptacles 72 may be positioned at various locations along the main body 20, with a preferred placement being in proximity to the attachment point 24. FIG. 5 illustrates a side view of the main body 20 in the open orientation. As illustrated in FIGS. 5 and 7, one or both sections 21, 22 may include extensions 89 that extend outward beyond the face of the respective section 21, 22. The extensions 89 are sized to fit within corresponding receptacles in the opposing section 21, 22 when the main body 20 is in the closed orientation. One or more of the attachments 30 may also include extensions 89 and corresponding receptacles.

Figure 6:
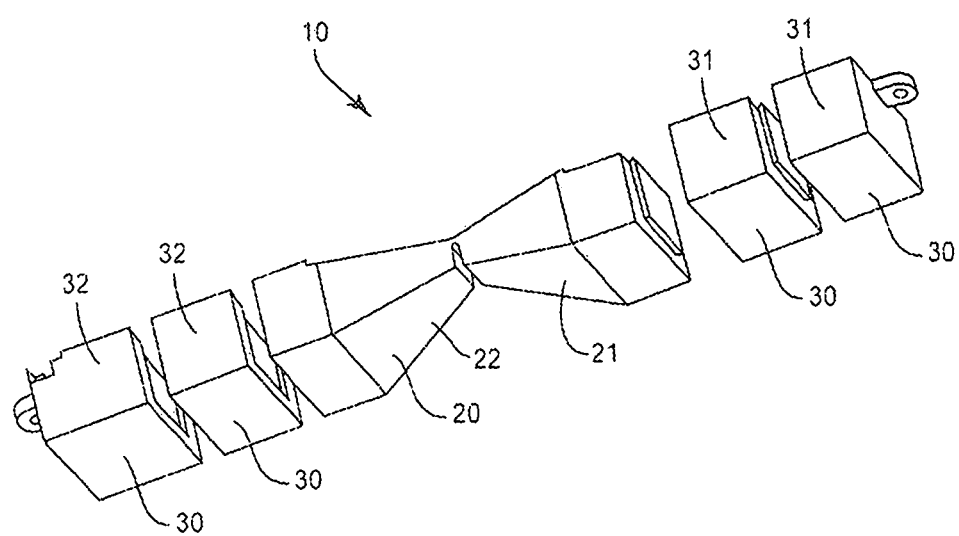
FIG. 6 is an exploded perspective view of a sinker.

The sinker 10 may be expanded in size and include one or more attachments 30. The attachments 30 connect to the main body 20 and each may include an additional compartment 25. The attachments 30 are removable, attachable, and detachable from the main body 20 as the fisherman deems necessary. FIG. 6 illustrates an embodiment that includes two attachments 30. Each attachment includes opposing first and second sections 31, 32 that are paired together. Various other embodiments may include one attachment 30 or three or more attachments 30. The sections 31, 32 are configured to be movable between open and closed orientations. The sections 31, 32 may be connected together by a hinge in a similar manner as described above for the main body 20, or they may be independent pieces that are configured to be attached together.

FIG. 7 illustrates a side view of the main body 20 and attachments 30, and FIG. 8 illustrates a front view of the main body 20 and attachments 30. The attachments 30 may each include a compartment 35 configured to receive a module 40. The compartments 35 may each include one or more supports 37 and one or more openings 70 as described above for similar elements in the main body 20. Each of attachments 30 may include the same or different shapes and/or sizes. The embodiment described above includes a multi-piece construction with dovetail joining features. Other embodiments may include a one-piece construction.

The attachments 30 are further configured to be connected to adjacent elements such as the main body 20 and/or other attachments 30. The attachments 30 may include at least one of a receptacle 80 and an extension 81 for connection to the adjacent elements. The receptacle 80 is configured to receive an extension 81 of an adjacent element. The receptacles 80 and extensions 81 may be configured to be removably connected together. In one embodiment as illustrated in FIGS. 7 and 8, the receptacles 80 and extensions 81 include dove-tail fittings. This provides for the attachment 30 to be connected to the adjacent extension 81 by aligning and moving the attachment 30 in a plane that is perpendicular to a central axis Y of the sinker 10. The dovetail attachment mechanism reduces or eliminates detachment of the attachment 30 while the sinker 10 is being used for fishing. Other connection mechanisms may also be used to attach the attachment 30. Examples include but are not limited to ultrasonic welding, gluing, and riveting.

Each of the main body 20 and attachments 30 may include the same connection mechanisms. This allows for the fisherman to construct the sinker 10 according to their needs and to place the various elements at various different relative positions. Other embodiments may include different types of connection mechanisms on some of the elements.

In one embodiment as illustrated in FIGS. 7 and 8, the sinker 10 includes a kit that includes a main body 20, and one or more attachments 30. In this embodiment, each of the connection mechanisms is the same such that the kit provides for the fisherman to construct the sinker 10 according to their specific needs for the particular fishing conditions. The main body 20 includes one or more compartments 25 and includes an extension 81 at the outer end. The extension 81 provides for receiving an attachment 30.

The various attachments 30 may include different constructions. Intermediate attachments 30 include a receptacle 80 on a first end and an extension 81 on an opposing second end. The intermediate attachments 30 can be attached as necessary to the main body 20 and to each other. Outer attachments 30 include a receptacle 80 on a first end to mate with the corresponding extension 81 on the adjacent element (either an intermediate attachment 30 or the main body 20). The outer attachments 30 also include an attachment point 82 on an opposing second end.

In one embodiment, the fisherman is able to insert various materials into the compartments 25, 35. This may include loose weights (such as weights they already own) or fish attractor. In other embodiments, the compartments 25, 35 are configured to receive modules 40 that include one or more of the various materials.

Figure 9:
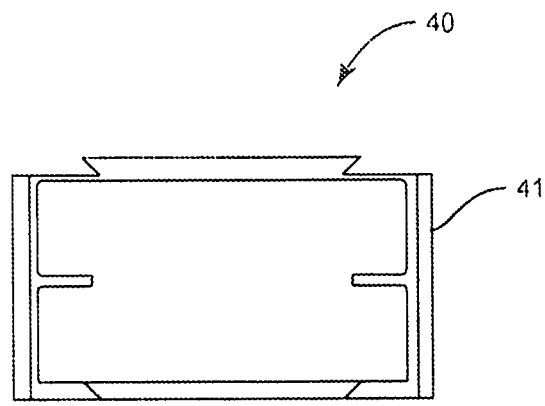
FIG. 9 is a front view of a module.
Figure 10:
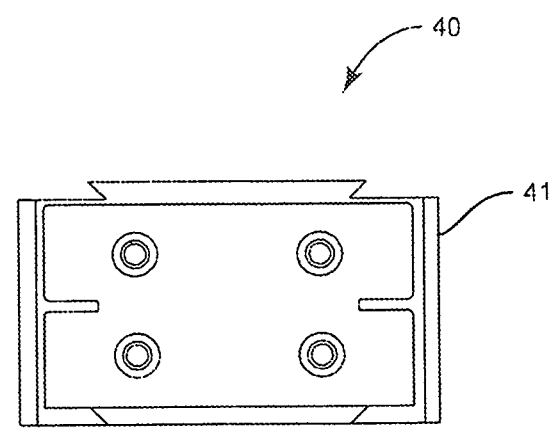
FIG. 10 is a front view of a module.

Each of the modules 40 is sized and shaped to be inserted into the compartments 25 in sections 21, 22. In one embodiment as illustrated in FIGS. 9 and 10, the modules 40 include a body 41 that is sized to hold the materials. The body 41 may include one or more slots that are configured to receive the supports 27, 37. The modules 40 may be constructed as a single piece, or may include two separate pieces that may be removably connected together. In one embodiment, each module 40 is constructed from two separate pieces that mate together to form an enclosed interior to hold the material. In another embodiment, each module 40 includes two sections that are held together by a hinge.

The modules 40 may be configured to hold a variety of different materials. In one embodiment, the modules 40 are configured to add additional weight. The body 41 may be constructed of a heavy material, such as lead or metal, or may include an interior space configured to receive weight. The modules 40 may be marked to indicate the amount of weight (e.g., ½ oz, 1 oz, 2 oz). The modules 40 may also include a fish attractor, such as one or more fish oil pills or cut bait modules. In one embodiment, the attractor is fixedly secured to the module 40 without requiring intervention by the fisherman. In another embodiment, the module 40 may be opened to allow for the fisherman to insert the desired fish attractor. In one embodiment, the body 41 itself is constructed of a material that acts as a fish attractor. The modules 40 may include dovetail connections to join to other components.

In another embodiment, the main body 20 and/or the attachments 30 are constructed such that it is not necessary to insert additional materials. In one embodiment, the main body 20 and attachments 30 each are constructed from a relatively heavy material and act as a weight for the sinker 10. In one specific embodiment, the main body 20 weighs a first amount (e.g., 1 oz) and the attachments 30 weight a second amount (e.g., ½ oz, 1 oz, 2 oz.). Each attachment 30 may weigh the same or different amounts. The fisherman is able to construct the sinker 10 with the necessary elements to obtain the desired weight. Likewise, one or more of these elements may be constructed or impregnated with a fish attractor. The fisherman again is able to construct the sinker 10 to have the desired characteristics.

In one embodiment of using the sinker 10, the user determines the amount of weight and/or the type of attractor that is to be used. The user selects the main body 20 and positions it in the open orientation. The fisherman then places the necessary weight and/or attractor within the one or more of the compartments 25. The weight and attractor may be positioned in separate compartments 25, or may be placed within one or more of the same compartments 25. The fisherman then folds the main body 20 together about the hinge 23 to the closed orientation.

If necessary, the user may also connect one or more attachments 30. In one embodiment, the one or more attachments 30 are opened and the applicable weight and/or attractor are placed within the inside. Once complete, the attachments 30 are placed in a closed orientation. The fisherman then connects the one or more attachments 30 to the main body 20. In one embodiment, the attachments 30 include a substantially flat end that includes a dovetail receptacle 80. Each attachment 30 is aligned with the outer element of the sinker 10 and slid into engagement with a receptacle 80 extending over a corresponding extension 81. The structure may also be reversed with the attachment 30 including an extension that is slid into a corresponding receptacle.

Once complete, the sinker 10 may be attached to the fishing line 102 of the user. This includes the user securing the line 102 to the attachment point 24 or 82 of the sinker 10. Once secured, the fisherman may then cast the sinker into the water 100.

As illustrated in FIG. 11, the sinker 10 may also include an anchor 50 that extends outward from the main body 20. The anchor 50 is shaped to engage with a bottom 101 of the lake, river, ocean, etc. to further secure the position of the sinker 10 in the water 100. As illustrated in the side view of FIG. 12 and the end view of FIG. 13, the anchor 50 includes an elongated member with first and second ends 51, 52. Anchor 50 also includes a central section 53. The anchor is positioned in the receptacle 71 (see FIG. 4) of the main body 20. In one embodiment, the central section 53 is positioned in the central section 73 of the receptacle 71 and extends through the outlets to position the ends 51, 52 on opposing sides of the main body 20. The central section 53 may include a bend 54. In one embodiment, the anchor 50 is a wire.

The anchor 50 is rotatable relative to the main body 20. In one embodiment, the anchor 50 is permanently secured in the main body 20. This may include attachment to the main body 20 by one or more mechanical fasteners or being molded into the main body 20. In another embodiment, the anchor 50 is removable from the main body 20 by the fisherman to be used at their discretion.

Figure 14B:
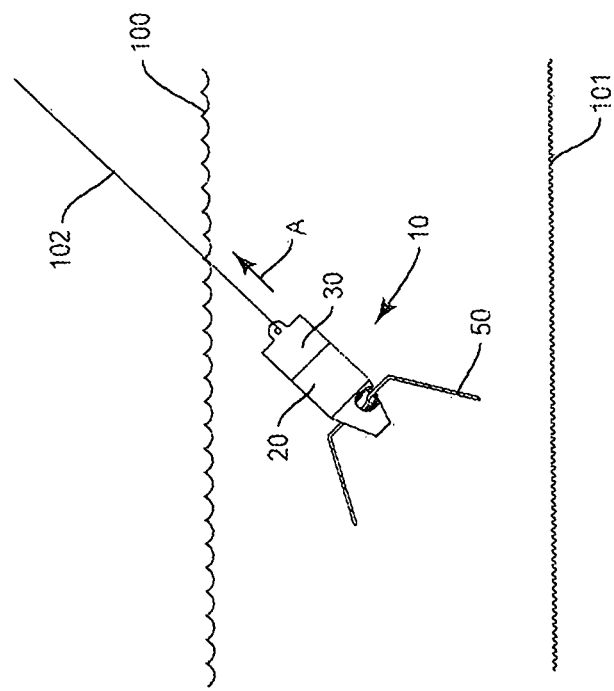
FIG. 14B is a side view of a sinker with an anchor in a second orientation.
Figure 14A:
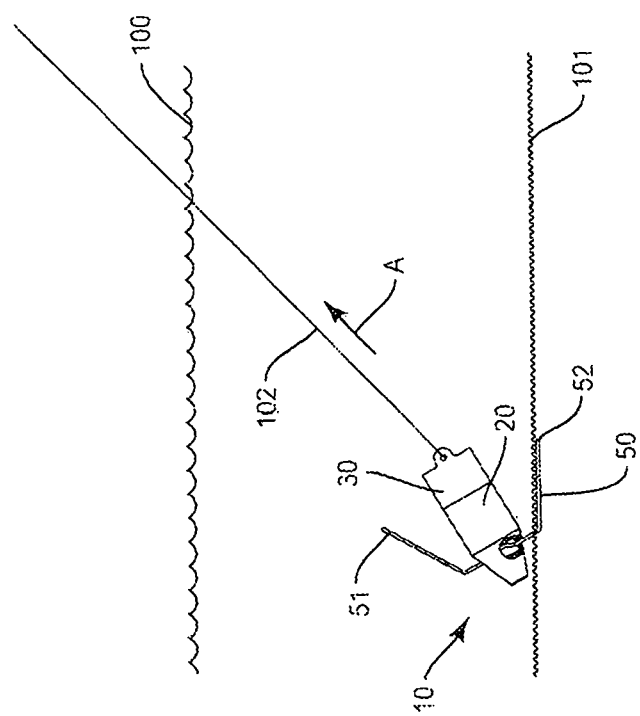
FIG. 14A is a side view of a sinker with an anchor in a first orientation.

FIGS. 14A and 14B illustrate one embodiment of a sinker 10 with an anchor 50. FIG. 14A illustrates the anchor 50 in a first orientation that occurs after the sinker 10 has been attached to the fishing line 102, cast into the water 100, and has sunk to the bottom 101. The first orientation includes the anchor 50 rotated with the ends 51, 52 positioned upward towards a top end of the sinker 10. In this position, the fisherman can reel in the line 102 a small amount while the sinker 10 is in contact with the bottom 101. This movement of the sinker 10 in the direction indicated by arrow A causes one of the ends (end 52 in FIG. 14A) to engage with the bottom 101 to further secure the position.

When the sinker 10 is reeled in by the fisherman, the anchor 50 rotates to a positioned as illustrated in FIG. 14B. This rotation may be caused when the sinker is pulled from the bottom 101 or by the force of the water as it moves past the sinker 10. This orientation causes the anchor 50 to have less drag in the water and facilitates the sinker 10 being reeled in by the fisherman.

In one embodiment, the anchor 50 is attached to the main body 20. Other embodiments may include the anchor 50 being attached to an attachment 30.

Figure 15:
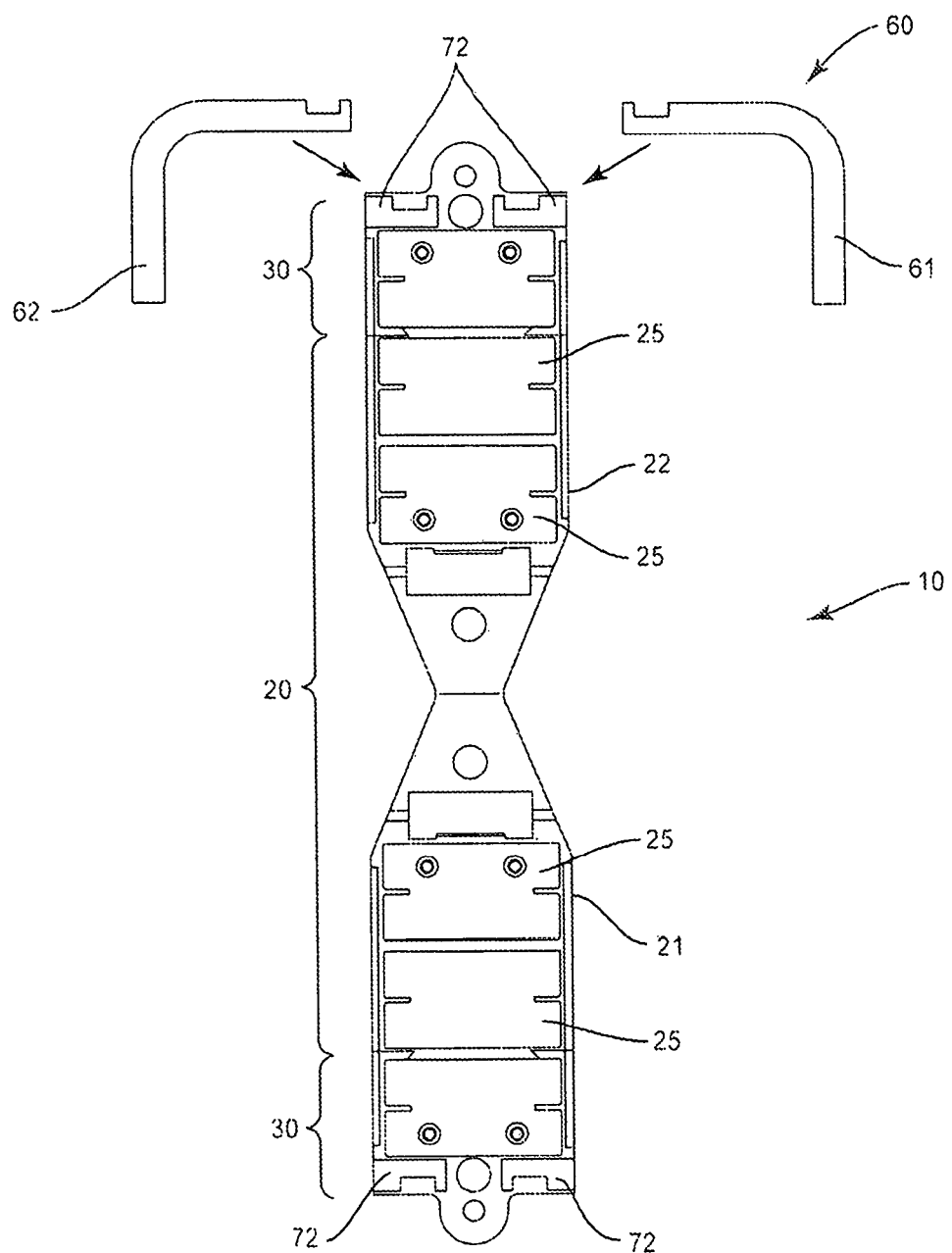
FIG. 15 is an exploded front view of a sinker with stabilizers in an open orientation.
Figure 16:
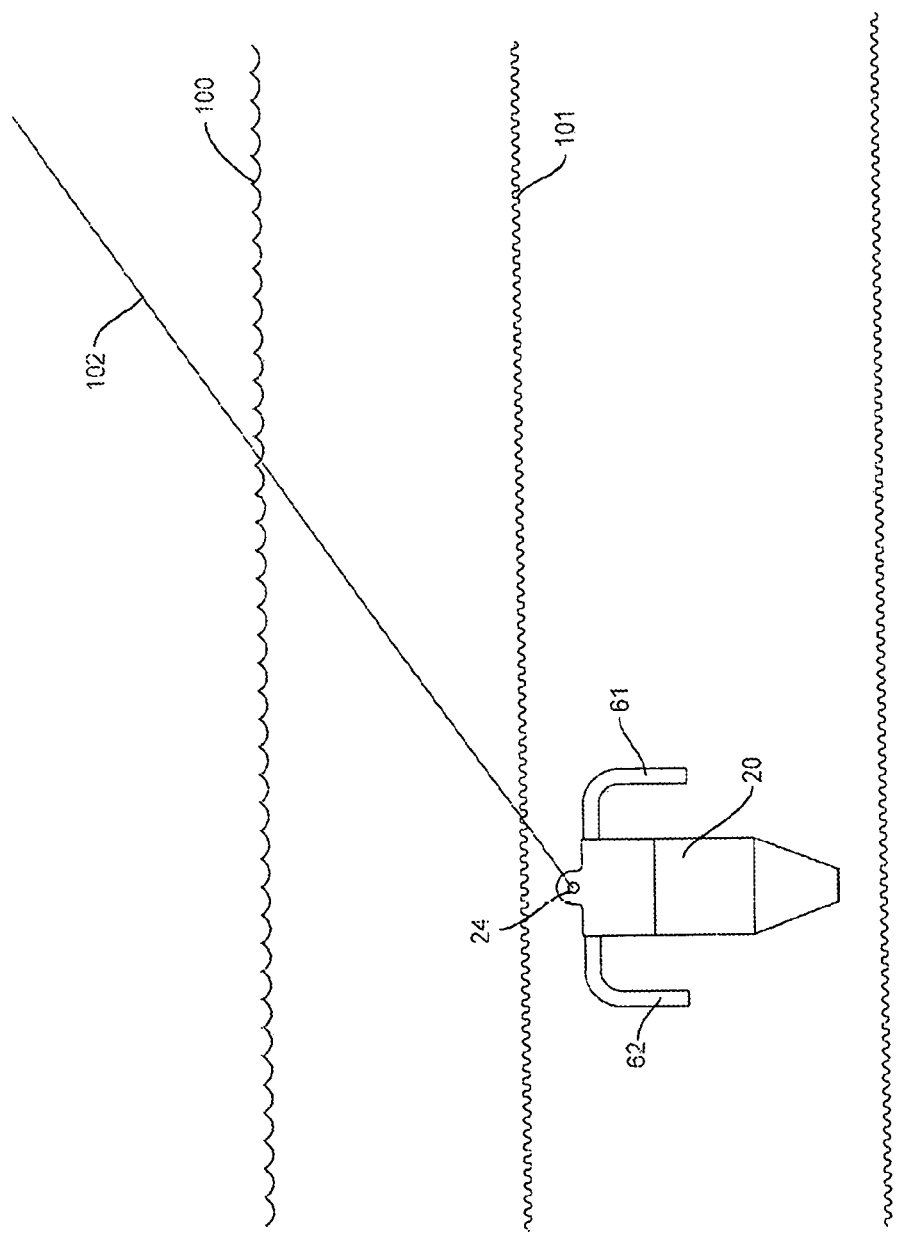
FIG. 16 is a side view of a sinker with stabilizers.

The sinker 10 may also include a stabilizer 60 as illustrated in FIGS. 15 and 16. These figures include the stabilizer 60 connected to and extending outward from the main body 20 or one of the attachments 30. FIG. 15 includes the stabilizer 60 extending outward from the outer attachment 30. The stabilizer 60 may also be connected to and extend outward from an attachment 30. The stabilizer 60 engages with the bottom 101 to stabilize the position of the sinker 10.

As illustrated in FIG. 15, the stabilizer 60 may include first and second arms 61, 62 that extend outward in opposing directions. Each arm 61, 62 may include a notch that engages with a corresponding extension in the receptacle 72 formed in the main body 20. The arms 61, 62 are fixedly connected to the main body 20 to prevent rotation. In one embodiment, the stabilizer 60 is fixedly connected to the main body 20 through one or more fasteners or being molded into the main body 20. In another embodiment, the stabilizer 60 is removably connected to the main body 20 and may be removed by the fisherman as necessary.

The stabilizer 60 may provide for positioning the sinker 10 in a particular orientation along the bottom 101. In the embodiment of FIG. 16, the bottom 101 is relatively soft, such as sand or mud. The stabilizer 60 engages with the bottom 101 and maintains the top end of the sinker 10 positioned upward such that the attachment point 24 with the line 102 is positioned upward.

FIG. 15 includes an embodiment with the main body 20 including two compartments 25. An attachment 30 is attached to the outer end of the main body 20 and is configured to receive the stabilizer 60.

The main body 20 and the attachments 30 may be constructed from a variety of materials. In one embodiment, one or both are constructed from a bio-degradable plastic. The main body 20 and/or the attachments 30 may also be constructed from a variety of other materials, including but not limited to plastic, metals, or any moldable material. One or more of the main body 20 and attachments 30 may also be impregnated with a fish attractor material.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A fishing sinker comprising:
a body with first and second sections, each section including opposing first and second ends, an open front face, one or more cavities that each includes a hollow interior space surrounded by outer walls and an open side at the front face;
an attachment comprising a first member configured to attach to the second end of the first section and a second member configured to attach to the second end of the second section,
the sinker configured to be positioned in an open orientation and a closed orientation;
the open orientation including the front faces of the first and second sections being spaced apart and the first and second members being separated;
the closed orientation including the front faces of the first and second sections being in contact and each of the one or more cavities of the first section being paired with a corresponding one of the cavities on the second section, the paired cavities each including a single enclosed interior space, and the first and second members being in contact to form an enclosed interior cavity.

2. The sinker of claim 1, wherein each of the first and second members comprising a cavity formed by a back wall, sidewalls, and with an open front face opposite from the back wall, the cavities being exposed in the open orientation and aligned together in the closed orientation with the first and second cavities positioned together to form the enclosed interior cavity.

3. The sinker of claim 1, further comprising a dove-tail extension that extends outward from one of the second end of the first section and an end of the first member and a receptacle configured to receive the dove-tail extension in the other of the second end of the first section and the end of the first member.

4. The sinker of claim 1, further comprising an extension that extends outward beyond the front face of the first section and a receptacle that extends into the front face of the second section, the extension being positioned in the receptacle in the closed orientation.

5. The sinker of claim 1, further comprising an enclosed opening positioned at an end of the first member, the opening configured to receive fishing line.

6. The sinker of claim 1, further comprising a plurality of openings in each of the first and second sections, each of the openings extending into one of the cavities.

7. A fishing sinker comprising:
an elongated body with first and second ends spaced apart along a major axis, the body comprising a first section and a second section;
a first cavity formed in the first section and positioned a first distance from the first end along the major axis, the first cavity including an open face;
a second cavity formed in the second section and positioned the first distance from the first end along the major axis, the second cavity including an open face;
an attachment removably connected to the second end of the body and comprising a first portion with a third cavity and a second portion with a fourth cavity;
the first and second sections being movable between open and closed orientations;

the open orientation comprising the first and second sections and the first and second portions being spaced apart and the first portion of the attachment removably connected to the first section and the second portion of the attachment removably connected to the second section;

the closed orientation comprises the first and second sections being positioned together with the first and second cavities forming a first enclosed interior space, and the first and second portions of the attachment being positioned together with the third and fourth cavities being positioned together forming a second enclosed interior space.

8. The sinker of claim 7, further comprising a fitting on the second end of the body and aligned perpendicular to the major axis, the fitting configured to engage with the attachment to removably connect the attachment to the body.

9. The sinker of claim 7, further comprising a wire anchor that includes a straight central section, a first bent arm on a first end of the central section, and a second bent arm on a second end of the central section, the central section positioned within the body in proximity to the first end with the first and second bent arms being positioned on opposing sides of the body.

10. The sinker of claim 7, wherein each of the first and second sections includes a common length measured along the major axis such that the first and second ends align in the closed orientation.

11. The sinker of claim 7, wherein the body includes a bullet shape with the first end being narrower than a second end measured perpendicular to the major axis.

12. The sinker of claim 7, further comprising a first opening in the body that leads into the first cavity and is positioned away from the open face of the first cavity, and a second opening in the body that leads into the second cavity and is positioned away from the open face of the second cavity.

13. A method of using a fishing sinker comprising:

positioning a main body in an open orientation with first and second sections of the main body being spaced apart and with each of a first cavity in the first section and a second cavity in the second section being exposed;

attaching a first attachment to an end of the first section, the first attachment having a third cavity;

attaching a second attachment to an end of the second section, the second attachment having a fourth cavity;

moving the first and second sections together;

contacting the first section against the second section and forming a first enclosed interior space with the first and second cavities, and contacting the first attachment against the second attachment and forming a second enclosed interior space.

14. The method of claim 13, further comprising removing the first and second attachments from the main body while the first and second sections remain in contact.

15. The method of claim 13, further comprising inserting one of a weight and a fish attractor into an open first compartment in the first section.

16. The method of claim 13, further comprising moving the main body through water and rotating an elongated wire anchor that extends through the main body such that exposed ends of the wire anchor face away from the direction of movement.

* * * * *